(12) United States Patent
Willett et al.

(10) Patent No.: US 7,693,754 B2
(45) Date of Patent: Apr. 6, 2010

(54) QUOTING SYSTEM FOR HOUSING COMPONENTS

(75) Inventors: Francis G. Willett, Adrian, MI (US); Heather S. Price, Morenci, MI (US); Steven L. Hester, Toledo, OH (US)

(73) Assignee: Masco Builder Cabinet Group, Adrian, MI (US)

( * ) Notice: Subject to any disclaimer, the term of this patent is extended or adjusted under 35 U.S.C. 154(b) by 848 days.

(21) Appl. No.: 11/218,312

(22) Filed: Sep. 1, 2005
(Under 37 CFR 1.47)

(65) Prior Publication Data
US 2007/0061212 A1 Mar. 15, 2007

(51) Int. Cl.
*G06F 17/30* (2006.01)
(52) U.S. Cl. .......................................... 705/27; 705/26
(58) Field of Classification Search .................. 705/27, 705/26, 37
See application file for complete search history.

(56) References Cited

U.S. PATENT DOCUMENTS

| | | | |
|---|---|---|---|
| 6,345,258 B1 * | 2/2002 | Pickens | 705/1 |
| 6,539,401 B1 * | 3/2003 | Fino et al. | 707/201 |
| 6,922,701 B1 * | 7/2005 | Ananian et al. | 707/104.1 |
| 2002/0099617 A1 * | 7/2002 | Fogelson | 705/26 |
| 2002/0188526 A1 * | 12/2002 | Muneishi et al. | 705/26 |

* cited by examiner

*Primary Examiner*—Robert M. Pond
(74) *Attorney, Agent, or Firm*—Carlson, Gaskey & Olds, P.C.

(57) ABSTRACT

A quoting system for housing components, especially cabinets, includes a product database storing a plurality of product identifiers for different cabinet components, each having an associated cabinet style. The database also includes identifiers for products and/or services that are outsourced. The user need enter the description and product or service identifiers only once for an entire quote. The user can assign the pricing by style (or wood species).

15 Claims, 4 Drawing Sheets

QUOTING SYSTEM FOR HOUSING COMPONENTS

BACKGROUND OF THE INVENTION

This invention relates to housing construction and more particularly to a system for generating a quote for housing components, namely cabinets.

Generally, when a housing development is under construction a cabinet supplier for the development provides the builder with a quote for cabinets for the houses in the development. The cabinet supplier has numerous product lines with different wood species (or styles), each with different prices. The builder selects a subset of the supplier's product lines of cabinets and the supplier provides a quote to the builder for the cabinets in that subset. This subset of cabinets is made available at different prices for selection by purchasers of the houses in the development. However, the subset of cabinets still presents numerous styles at numerous different prices. In order to simplify the selection process for the purchasers, these cabinets are usually subgrouped into "buckets," so that all cabinets in the same bucket have the same price. Therefore, the decision for the purchaser can be simplified into "standard, upgraded or premium" price levels (for example), with several cabinets available at each price level.

The housing development typically includes several floor plans, each with different requirements for cabinets. Each floor plan may further include optional layouts, such as an expanded kitchen or master bath, which would have different requirements for cabinets.

The cabinet supplier provides a quote to the builder for each optional layout of each floor plan in each style of available cabinet. In that way, the builder could provide the range of options to the purchasers and the prices for each option. When the purchaser selects a floor plan, any optional layouts and cabinet style, the builder would communicate these selections to the cabinet supplier to place the order.

The quotes often include products and/or services that are outsourced. The price for these products or services often varies by wood species, causing a user to have to enter an appropriate price for each style. Maintenance for these outsourced items has to be done individually at each occurrence in the quote. The current quoting system allows only one price per outsourced item. A user must therefore manually manipulate the quote output to reflect the price by style. In addition, the pricing is not stored and to maintain, must be recreated.

SUMMARY OF THE INVENTION

An improved quoting system for housing components, especially cabinets, is provided by the present invention. The quoting system includes a product database storing a plurality of product identifiers for different cabinet components, each having an associated cabinet style.

The database also includes identifiers for products and/or services that are outsourced. The user need enter the description and product or service identifiers only once for an entire quote. The user can assign the pricing by style (or wood species).

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENTS

Figure 1:
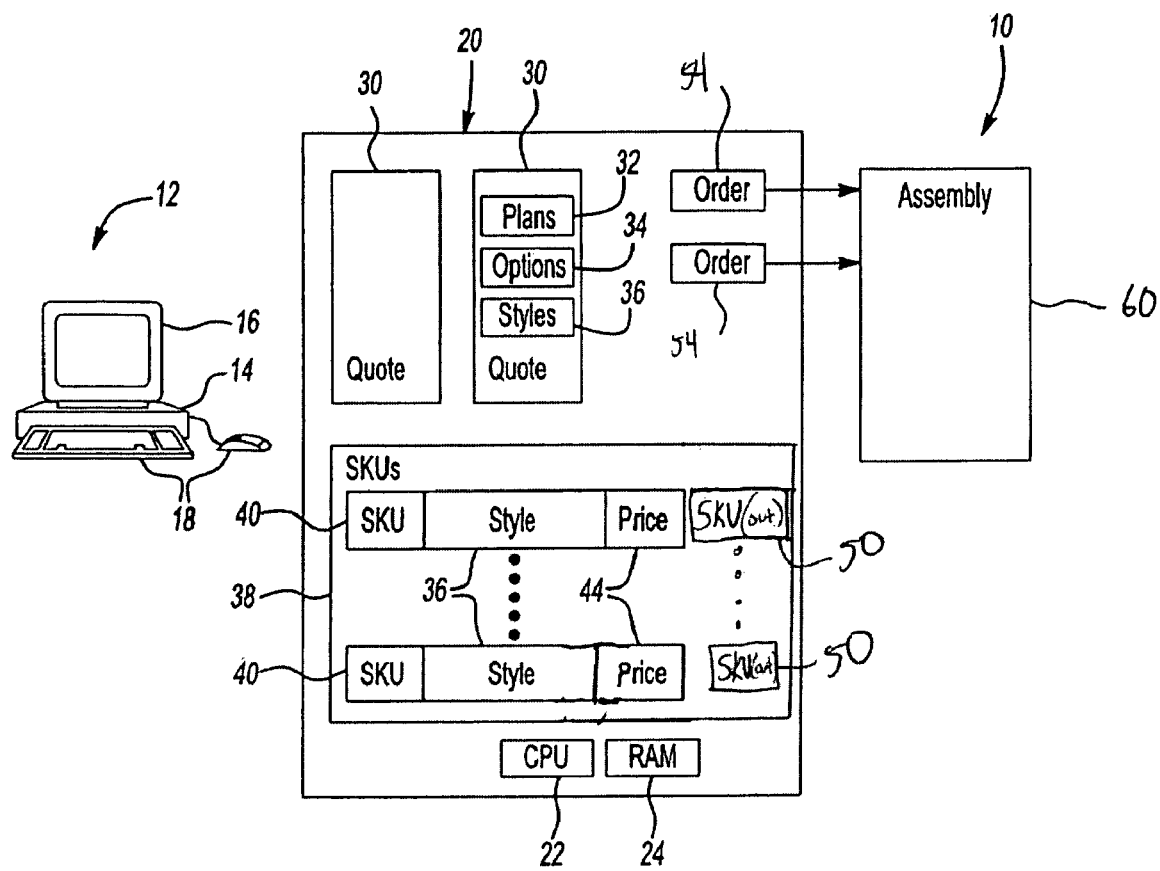
FIG. 1 is a schematic of one possible quoting system according to the present invention.

A quoting and ordering system 10 according to one embodiment of the present invention is shown schematically in FIG. 1. The system 10 includes one or more user computers 12 (one shown) each having a CPU 14, display 16 and user input devices 18. The user computer 12 is networked to a server 20 having a CPU 22 and storage media 24, such as RAM, hard drives, and any other computer storage storing software for performing the functions described herein.

The storage media 24 further includes a database of a plurality of quotes 30. Each quote 30 (only one is shown in detail) stores information regarding the plans 32, layout options 34 and styles 36 associated with a different housing development. Each quote 30 associates each of the plans 32, options 34 and styles 36 with internal SKUs 40 and outsourced SKUs 50 in a SKU database 38. The SKU database 38 lists all SKUs 40, 50 (or part numbers or product ids) associated with all cabinet components and associated hardware. The internal SKUs 40 for cabinet components are each associated with a cabinet style 36 and may have an associated price 44 (or price code or discount information). The outsourced SKUs 50 may represent products and/or services that are outsourced by the cabinet supplier. The outsourced SKUs 50 will be discussed in more detail later below.

Based upon the software and user inputs via user computer 12, the server 20 converts the quotes 30 to orders 54. The orders 54 contain the specific SKUs 40 needed for a house, the total price, delivery date, delivery location, billing party, etc. The orders 54 are sent to an assembly plant 60 where the cabinets are assembled for each order 54. The user computer 12 may access software running on the server 20 via a web browser, for example.

Figure 2:
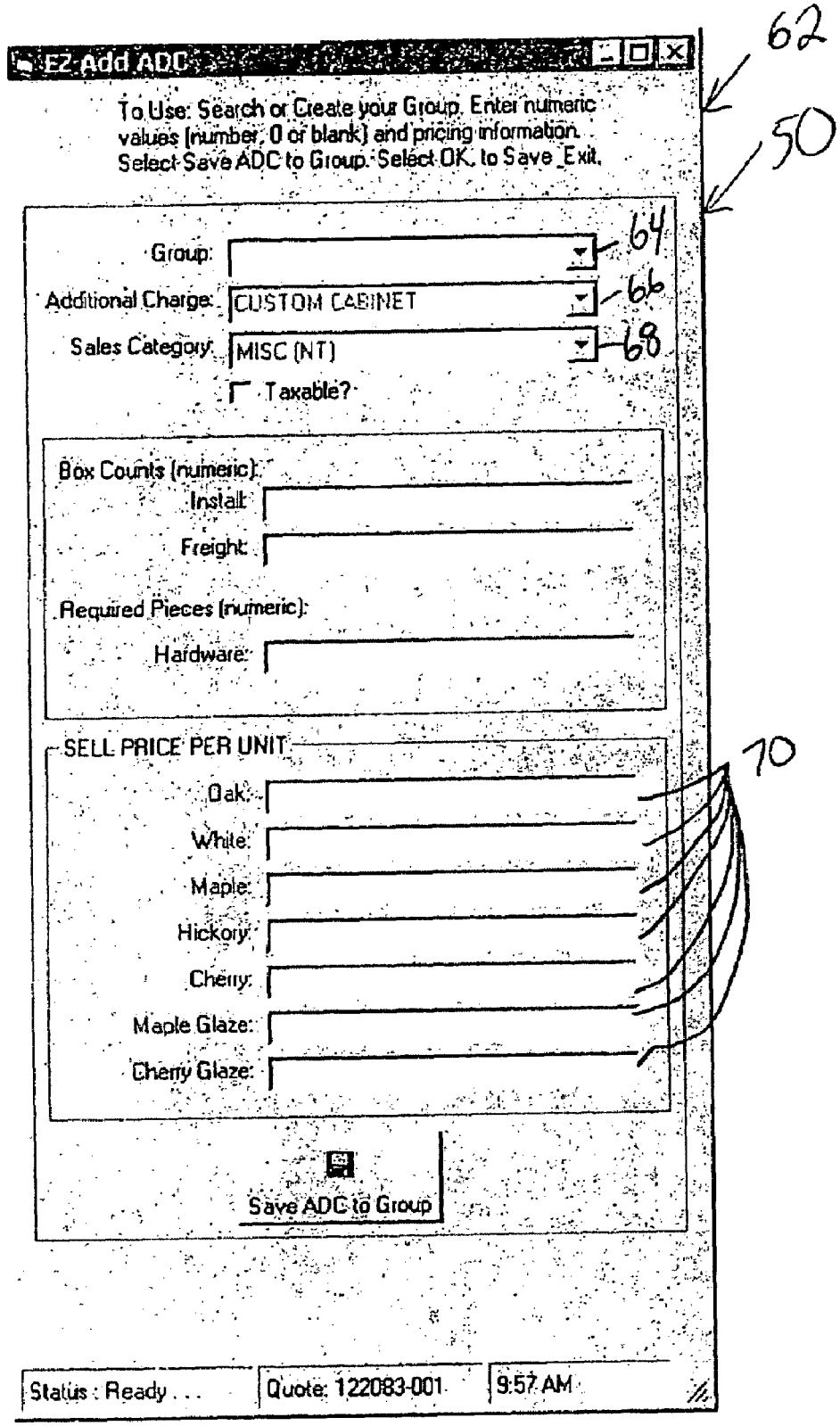
FIG. 2 illustrates one possible computer screen for entering information for an outsourced item in a quote.

FIG. 2 illustrates a popup screen 62 for entering information related to an outsourced SKU 50. In popup screen 62, the user enters information to be associated with the outsourced SKU 50. From Group popup menu 64, the user selects a group with which to associated the outsourced SKU 50. The user selects an identification or description of the outsourced SKU 50 in the Additional Charge popup menu 66. The user may also assign a sales category with Sales Category popup menu 68. For each outsourced SKU 50, the user also enters a price in each one of the Price Per Unit fields 70. Each one of the Price Per Unit fields 70 is associated with a particular wood species, such that the outsourced SKU 50 need only be entered once, but can have a different price for each wood species.

Figure 3:
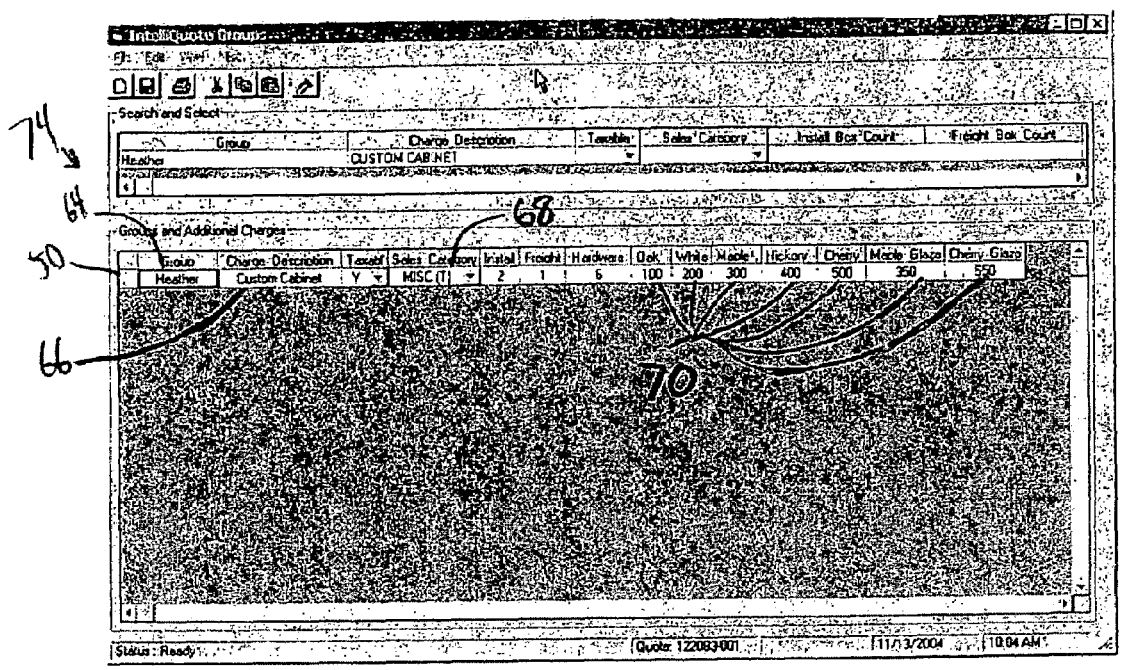
FIG. 3 illustrates how the outsourced item is stored by group.

As shown in the Group Selection screen 74 in FIG. 3, the outsourced SKUs 50 (only one shown) are stored by group. Therefore, the Price Per Unit fields 70 can be modified in the Group Selection screen 74 for the changes to take effect globally (i.e. across all quotes).

Figure 4:
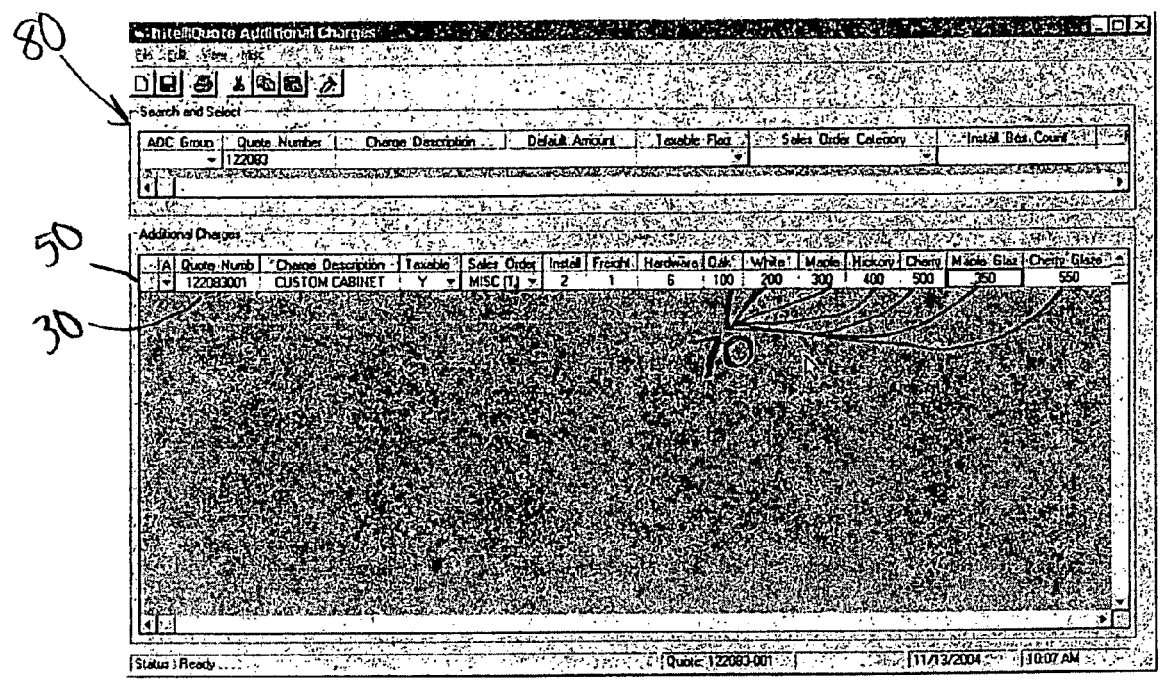
FIG. 4 illustrates how the outsourced item is stored by quote.

Additionally, the outsourced SKUs 50 are also stored by quote 30 as shown in the Quote Selection screen 80 in FIG. 4. Therefore, changes to the Price Per Unit fields 70 can be contained to the selected quote 30, without changing the prices in the other quotes. The changes to the Price Per Unit fields 70 are stored until overridden by a global change, as shown in FIG. 3.

In operation, referring back to FIG. 1, when generating a quote 30, the quote 30 is based upon the various plans 32, options 34 and styles 36 by pulling the prices 44 from the required SKUs 40. The quote 30 is also based upon the outsourced SKUs 50, the prices of which will vary automatically for each wood species selected.

The system 10 and method of the present invention streamlines the quoting process. Then, referring to FIG. 1, when an order 54 is placed, an order 54 is generated based upon the associated pricing in the quote 30. The orders 54 contain the specific SKUs 40 needed for a house, the total price, delivery date, delivery location, billing party, etc. The orders 54 are sent to an assembly plant 60 where the cabinets are assembled for each order 54.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A cabinet quoting system comprising:
 a product database storing a plurality of internal product identifiers each having associated therewith one of a plurality of styles, the product database further including outsourced product identifiers, each of the outsourced product identifiers having a plurality of associated prices, each associated with one of the plurality of styles;
 a user interface permitting a user to modify the associated prices in the product database for each of the outsourced product identifiers independently for each of the plurality of styles; and
 a computer generating a quote based upon a selected style of the plurality of styles and based upon the associated price of the plurality of associated prices that is associated with the selected style.

2. The system of claim 1 further including a plurality of floorplans, the computer generating the quote based upon the floorplans and the price associated with the selected style.

3. The system of claim 2 wherein the plurality of styles represent a plurality of wood species.

4. The system of claim 1 wherein the plurality of styles is a plurality of wood species, such that each outsourced product identifier has associated therewith the plurality of wood species, each having associated therewith one of the plurality of prices.

5. The system of claim 4 wherein the quote is one of a plurality of quotes, and wherein the user interface permits a user to apply a modification of one of the plurality of prices for one of the plurality of wood species to the plurality of quotes.

6. The system of claim 5 wherein the quote is one of a plurality of quotes, wherein the user interface permits a user to apply a modification of one of the plurality of prices for one of the plurality of wood species to the quote.

7. The system of claim 4 wherein the product identifiers are cabinet part identifiers.

8. A method for generating quotes for cabinets by a computer and a computer database for a housing development including the steps of:
 a) associating in the computer database each of a plurality of cabinet components with one of a plurality of styles wherein each of a plurality of cabinet components are associated with a stock keeping unit (SKU) number;
 b) associating each of a plurality of outsourced SKUs with a plurality of prices in the computer database, wherein each of the plurality of outsourced SKUs are associated with one of the plurality of styles in the computer database;
 (c) storing each of the plurality of outsource SKUs with a group and associating the group with a quote; and
 d) generating the quote based upon the price associated with a selected one of the plurality of styles and a selected one of a plurality of floorplans.

9. The method of claim 8 wherein the quote in said step d) associates each of a plurality of floorplans with a total price.

10. The method of claim 8 wherein said step d) further including the step of selecting at least one of the plurality of cabinet components, and wherein said step d) is further based upon a price associated with the selected at least one cabinet component.

11. The method of claim 8 further including the step of storing the quote in the computer database.

12. A cabinet quoting system comprising:
 a product database storing a plurality of internal cabinet component identifiers each having associated therewith one of a plurality of wood species, the product database further including outsourced item identifiers, each of the outsourced item identifiers having a plurality of associated prices, each associated with one of the plurality of wood species;
 a user interface configured to select a selected wood species of the plurality of wood species; and
 a computer generating a plurality of quotes based upon selections of wood species and based upon the associated prices that are associated with the selections of wood species, wherein the user interface permits a user to modify one of the plurality of associated prices for one of the plurality of wood species wherein the computer automatically applies the modification to the plurality of quotes.

13. The system of claim 12 further including a plurality of floorplan identifiers, the computer generating the quote based upon the floorplan identifiers and the price associated with the selected wood species.

14. The system of claim 12 wherein the quote is one of a plurality of quotes, and wherein the user interface permits a user to apply a modification of one of the plurality of prices for one of the plurality of wood species to the plurality of quotes.

15. The system of claim 12 wherein the quote is one of a plurality of quotes, wherein the user interface permits a user to apply a modification of one of the plurality of prices for one of the plurality of wood species to the quote.

* * * * *